United States Patent
Tang

(10) Patent No.: US 8,755,602 B2
(45) Date of Patent: Jun. 17, 2014

(54) ELECTRONIC APPARATUS AND METHOD FOR BINARIZING IMAGE

(75) Inventor: Pei-Chong Tang, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 43 days.

(21) Appl. No.: 13/600,234

(22) Filed: Aug. 31, 2012

(65) Prior Publication Data

US 2013/0259370 A1    Oct. 3, 2013

(30) Foreign Application Priority Data

Apr. 2, 2012  (CN) .......................... 2012 1 0096196

(51) Int. Cl.
*G06K 9/00* (2006.01)
*G06K 9/36* (2006.01)
*G06K 9/38* (2006.01)

(52) U.S. Cl.
CPC ........................................ *G06K 9/38* (2013.01)
USPC ............................ 382/172; 382/168; 382/171

(58) Field of Classification Search
None
See application file for complete search history.

(56) References Cited

U.S. PATENT DOCUMENTS

| | | | | |
|---|---|---|---|---|
| 2003/0031366 | A1* | 2/2003 | Li et al. | 382/206 |
| 2005/0123195 | A1* | 6/2005 | Takarada | 382/172 |
| 2009/0284803 | A1* | 11/2009 | Omura et al. | 358/426.01 |
| 2010/0061631 | A1* | 3/2010 | Omori | 382/170 |
| 2010/0158373 | A1* | 6/2010 | Li et al. | 382/172 |
| 2010/0220927 | A1* | 9/2010 | Kim et al. | 382/170 |
| 2013/0016906 | A1* | 1/2013 | Kakino | 382/169 |
| 2013/0039574 | A1* | 2/2013 | McKay et al. | 382/167 |
| 2013/0182936 | A1* | 7/2013 | Yoshihara et al. | 382/133 |

OTHER PUBLICATIONS

Trier, Oeivind Due, and Torfinn Taxt. "Evaluation of binarization methods for document images." Pattern Analysis and Machine Intelligence, IEEE Transactions on 17.3 (1995): 312-315.*
Otsu, Nobuyuki. "A threshold selection method from gray-level histograms."IEEE Trans. on Systems, Man, and Cybernetics, 1979.*

\* cited by examiner

*Primary Examiner* — Li Liu
(74) *Attorney, Agent, or Firm* — Novak Druce Connolly Bove + Quigg LLP

(57) ABSTRACT

An electronic apparatus and method obtains an original image, converts the original image into gray level to determine a gray level distribution of the original image, and defines a fuzzy region and a flat region and a fuzzy region according to the gray level distribution and a binary threshold. The electronic apparatus and method compares the pixel gray values in the fuzzy region with pixel gray values in the flat region to re-define the pixel gray values in the fuzzy region according to the comparison and a formula, and binarizes the original image to output an binarized image.

16 Claims, 8 Drawing Sheets

ELECTRONIC APPARATUS AND METHOD FOR BINARIZING IMAGE

BACKGROUND

1. Technical Field

The present disclosure relates to an electronic apparatus and a method for binarizing image.

2. Description of the Related Art

Generally, a target object in the original image can be extracted from the background of the original image, as shown in FIG. 1B, by binarizing the original image shown in FIG. 1A. In fact, there are several degrees of pixels gray values having been changed from the target object to the background. The pixel gray values in the gradually changed region and the remaining region of the image binarized in a same standard will change shape and size of the extracted target object.

BRIEF DESCRIPTION OF THE DRAWING

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1A:
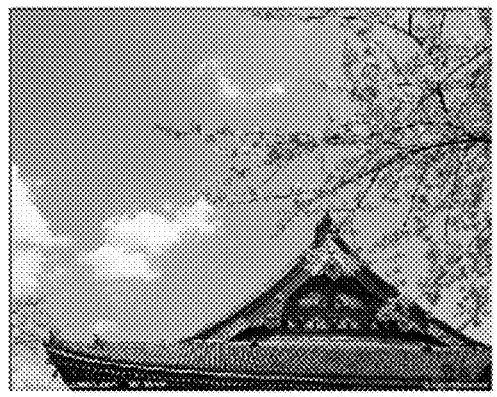
FIGS. 1a-1b show an original image and a binarized image of the original image processed by an electronic apparatus.
Figure 1B:
Figure 2:
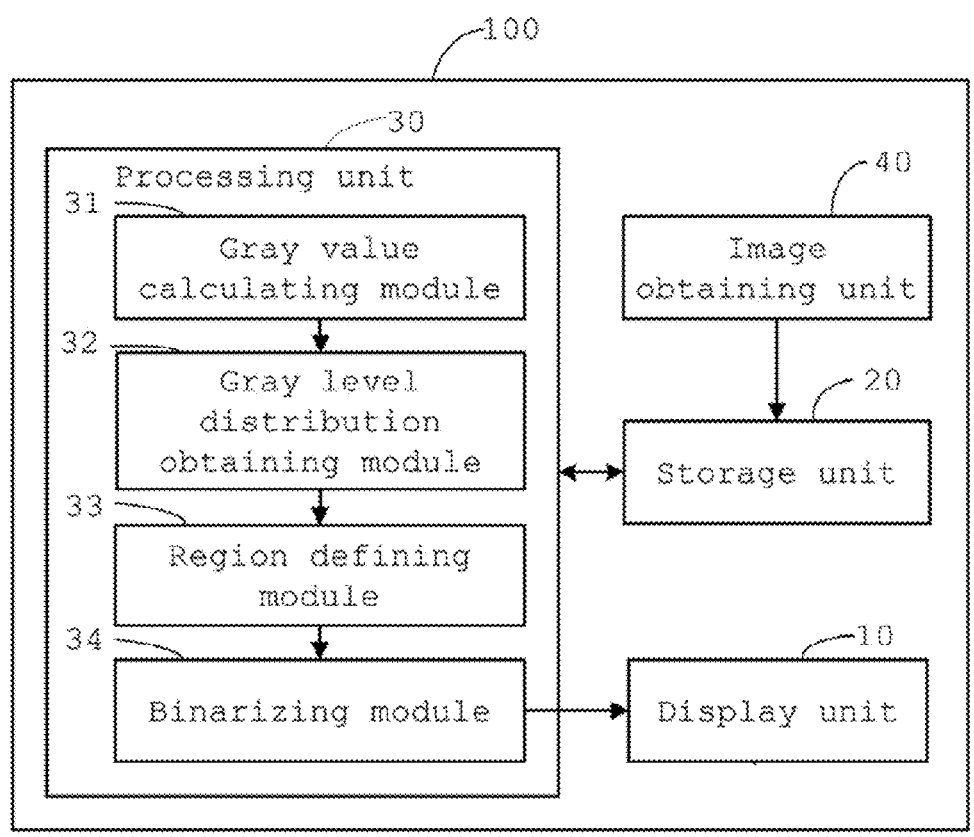
FIG. 2 is a block diagram of the electronic apparatus for binarizing the original image of FIG. 1, in accordance with an exemplary embodiment.

FIG. 2 includes an electronic apparatus 100 includes a display unit 10, a storage unit 20, a processing unit 30, and an image obtaining unit 40. The image obtaining unit 40 is configured for obtaining an original image, and the storage unit 20 is configured for storing the original image. In the embodiment, the image obtaining unit 40 is an image sensor such as a charge coupled device, and configured for capturing the original image. The processing unit 30 is configured for converting the original image into a gray level image to determine a gray level distribution 16 of the original image, and determining a binary threshold M of the original image. The processing unit 30 is further configured for defining a fuzzy region 14 and a flat region 15 of the original image according to the gray level distribution 16 and the binary threshold M. The processing unit 30 compares the pixel gray values of the pixels in the fuzzy region 14 with the pixel gray values of the pixels in adjacent region to re-define the pixel gray values in the fuzzy region 14, and further binarizes the original image and displays the binarized image on the display unit 10.

The fuzzy region 14 is a border area between a target object(s) and a background of the original image. Pixel gray values of neighbor pixels in the fuzzy region 14 are gradually changed from the target object to the background. The flat region 15 is a remaining part of the image excepting the fuzzy region 14. Pixel gray values of neighbor pixels in the flat region 15 are approximately the same.

The processing unit 30 obtains a Bayer matrix of the original image captured by the image obtaining unit 40, and converts the original image into the gray level image. In an alternative embodiment, the processing unit 30 compresses the Bayer matrix of the original image into a JPG mode image. In another embodiment, the processing unit 30 converts an image of the original image processed in imaging-link into gray level.

The processing unit 30 includes a gray value calculating module 31, a gray level distribution obtaining module 32, a region defining module 33, and a binarizing module 34. The gray value calculating module 31 is configured for converting the original image obtained from the storage unit 20 into gray level, and obtaining the gray level distribution 16 of the original image. For example, the gray value calculating module 31 calculates a mean value of a red component, a green component, and a blue component of each pixel to determine the gray value of the pixel, and further converts the original image into gray level correspondingly. The gray value of each pixel of the gray level image falls in the region of 0 to 255.

Figure 3:
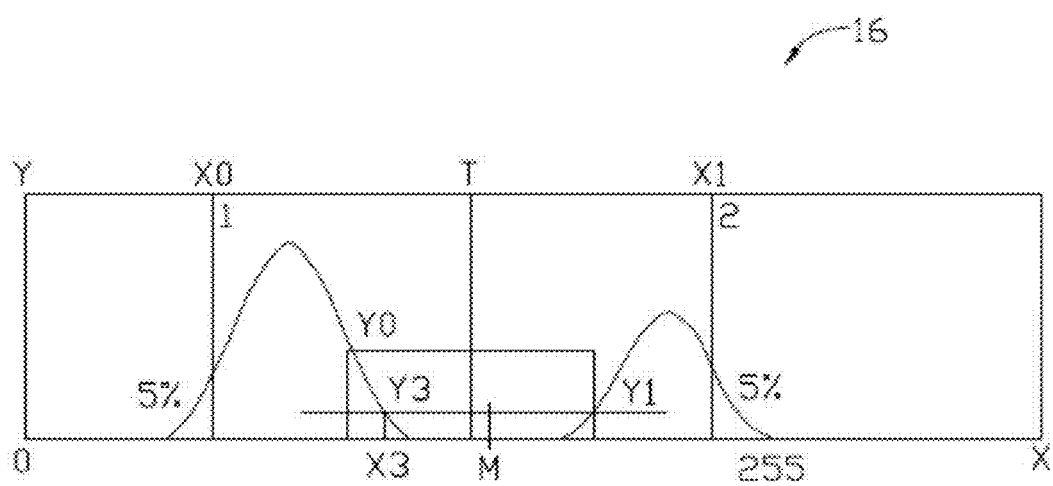
FIG. 3 is a histogram illustrating a gray level distribution of the original image determined by the electronic apparatus of FIG. 2, in accordance with an exemplary embodiment.

Referring to FIG. 3, the gray level distribution obtaining module 32 is configured for obtaining the gray level distribution 16 of the gray level image converted by the gray value calculating module 31. In the embodiment, the gray level distribution obtaining module 32 counts the number of pixels of each gray value in the gray level image to determine the gray level distribution 16. The gray level distribution is a gray histogram, as shown in FIG. 3. X-axis is the gray values from 0 to 255, and y-axis is the numbers of the pixels corresponding to the gray values.

The region defining module 33 is configured for determining the binary threshold M according to the gray level distribution 16. In detail, for example, the region defining module 33 calculates that a number of pixels cumulated from the gray value 0 to a gray value $X_0$ takes up n (such as 5) percent of the total number of pixels cumulated from the gray values 0 to 255. $X_0$ is marked to be a first terminal point and $X_1$ is marked to be a second terminal point, as shown in FIG. 3.

The region defining module 33 determines a gray value $T=(X_0+X_1)/2$. The region defining module 33 calculates the number $Y_0$ of the pixels corresponding to a gray value $(3X_0+X_1)/4$ and the number $Y_1$ of the pixels corresponding to a gray value $(X_0+3X_1)/4$. T is an intermediate point of a predetermined region with the width of $(X_1-X_0)/2$, between $(3X_0+X_1)/4$ and $(X_0+3X_1)/4$. The region defining module 33 compares $Y_0$ and $Y_1$ to determine a smaller one, and further searches in the region centered by T and extended along T to $X_0$ and $X_1$ both for a value of $(X_1-X_0)/2$ to determine a vertical coordinate $Y_3$ which is equal to the smaller one, and further determines a horizontal ordinate $X_3$ corresponding to the vertical coordinate $Y_3$. The region defining module 33 searches in the region between $X_3$ and $(X_0+3X_1)/4$ to determine a smallest vertical coordinate, and further determines a horizontal ordinate corresponding to the smallest vertical coordinate to be defined as the binary threshold M.

Figure 4:
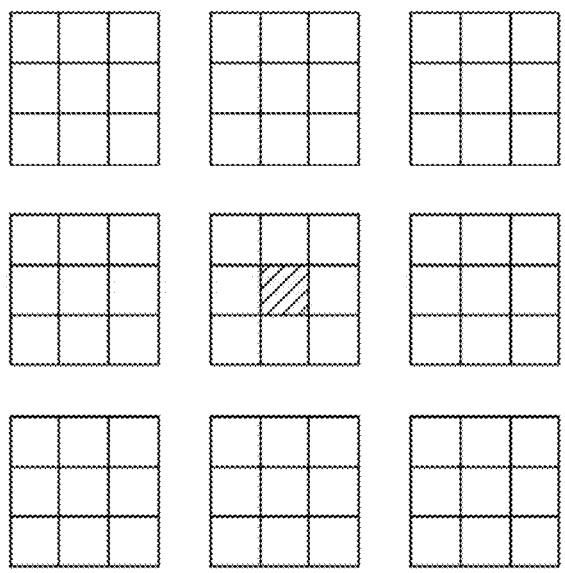
FIG. 4 is a distribution diagram illustrating a plurality of pixel groups of a flat region divided by the electronic apparatus of FIG. 2, in accordance with an exemplary embodiment.

The region defining module 33 defines the fuzzy region 14 and the flat region 15 according to the binary threshold M, and determines logic values of the pixels of the flat region 15. Referring to FIG. 4, in the embodiment, the region defining module 33 divides the pixels of the original image into N pixel groups 13. Each pixel group 13 includes A M*M matrixes. The region defining module 33 calculates a mean value of the pixel gray values of each matrix of each pixel group 13, and further determines the largest pixel gray value and the smallest pixel gray value of each pixel group 13. When the largest pixel gray value and the smallest gray value of the pixel group 13 are determined both to be larger than or smaller than the binary threshold M, the region defining module 33 defines the pixel groups 13 to be the flat region 15. When the largest pixel gray value of the pixel group 13 is determined to be larger than the binary threshold M and the smallest pixel gray value is determined to be smaller than the binary threshold M, the region defining module 33 defines the pixel groups 13 to be the fuzzy region 14.

Figure 5:
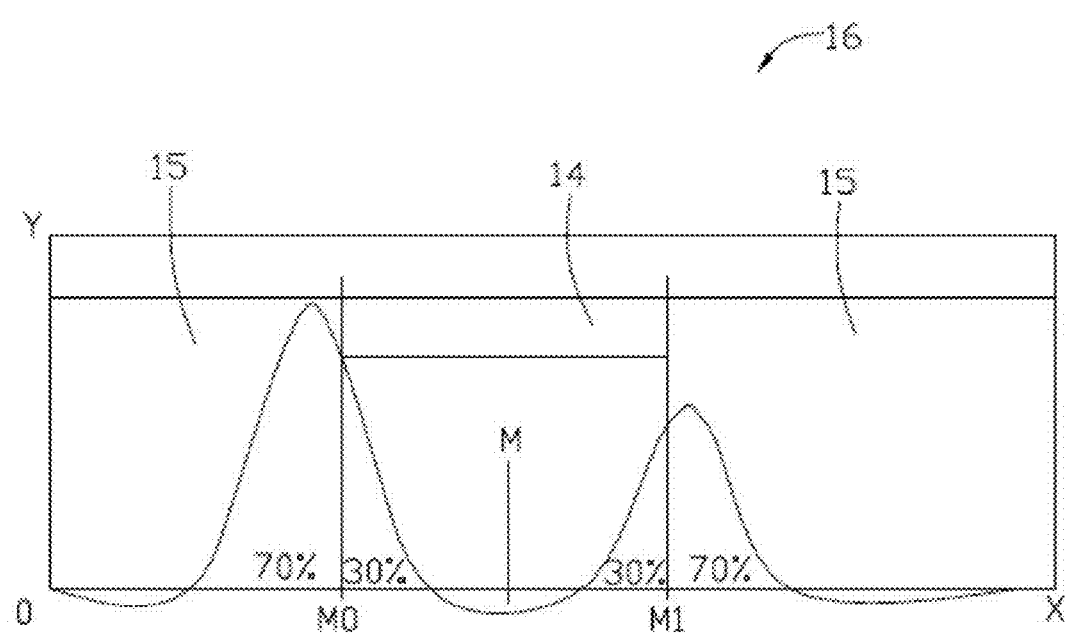
FIG. 5 is a distribution diagram illustrating logic values of pixels with gray values between 0 and 255 determined by the electronic apparatus of FIG. 1, in accordance with an exemplary embodiment.

In the embodiment of FIG. 5, the pixel having pixel gray value which is larger than the binary threshold M is determined to be logic 1, the pixel having pixel gray value which is smaller than the binary threshold M is determined to be logic. The region defining module 33 calculates the number of the pixels with logic 0 and the number of pixels with logic 1. The region defining module 33 further calculates a number of pixels cumulated from the pixel gray value 0 to 255 takes up m (such as seven) percent of the total number of pixels with logic 0, and number of pixels cumulated from the pixel gray value 255 to 0 also takes up m (such as seven) percent of the total number of pixels with logic 1. $M_0$ is marked to be a first verification point and $M_1$ is marked to be a second verification point, as shown in FIG. 5. When the pixel gray value is determined to be larger than $M_1$, the region defining module 33 re-determines the pixel with the pixel gray value to be logic 1. When the pixel gray value is determined to be smaller than $M_0$, the region defining module 33 re-determines the pixel with the pixel gray value to be logic 0. The region defining module 33 re-defines the pixels with the pixel gray values falling between $M_0$ and $M_1$ to be the fuzzy region 14.

Figure 6:
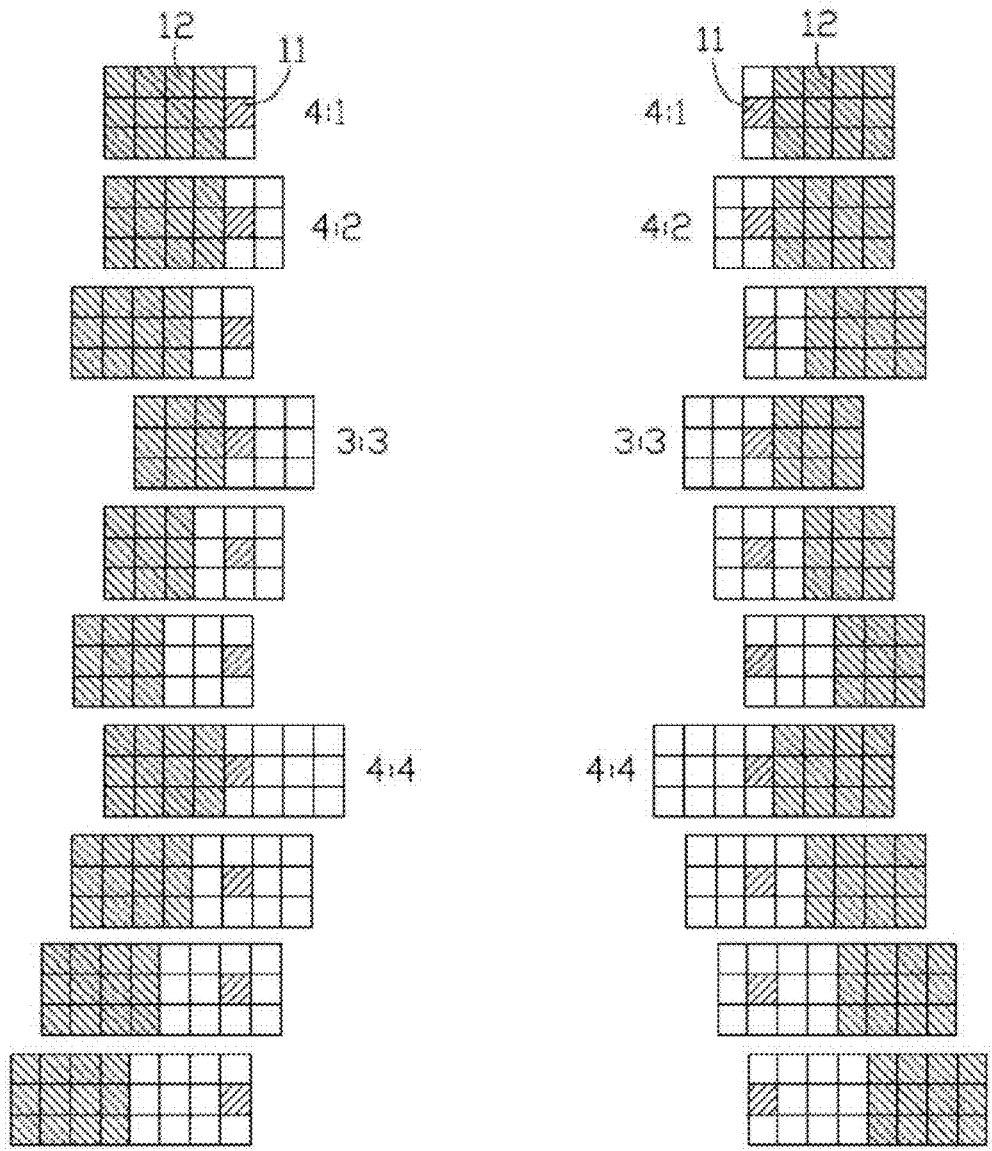
FIG. 6 is a horizontal comparison diagram illustrating gray values of the pixels in a fuzzy area and in a flat area, in accordance with an exemplary embodiment.
Figure 7:
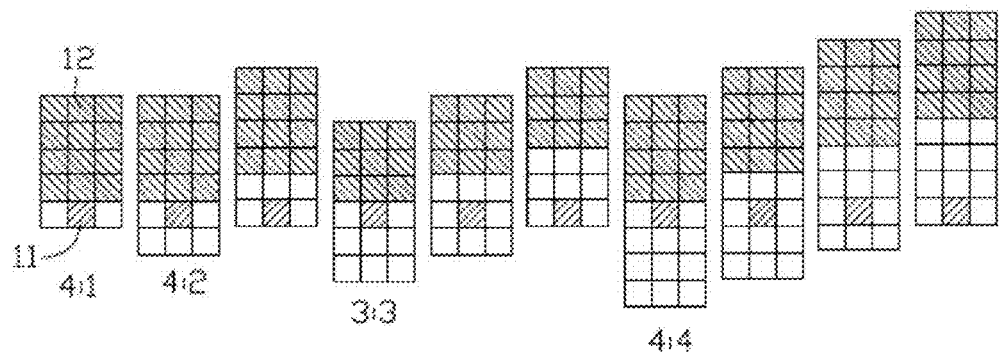
FIG. 7 is a longitudinal comparison diagram illustrating gray values of the pixels in the fuzzy region and in the flat region, in accordance with an exemplary embodiment.
Figure 7:
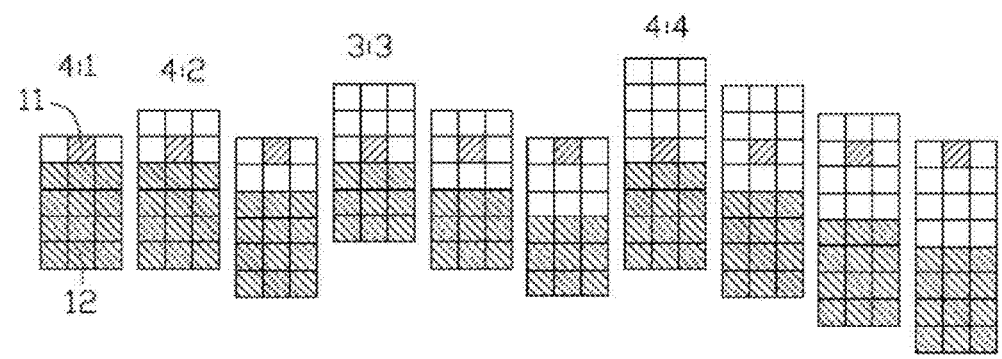

The binarizing module 34 compares the pixel gray values $d_i$ of the fuzzy region 14 with that of the flat region 15, and re-defines the pixel gray values of the pixels of the fuzzy region 14 according to the comparison. Referring to FIGS. 6 and 7, in the embodiment, the binarizing module 34 selects ten pixel groups which includes a pixel 11 in the fuzzy region 14 and at least one pixel 12 in the flat region 15, and compares the pixel gray value $D_i$ of the pixel 11 with the mean gray value of the at least one pixel 12 of each group. The binarizing module 34 determines a largest difference AC according to the ten comparisons of the ten pixel groups.

The binarizing module 34 re-defines the pixel gray value $d_i$ of the pixel of the fuzzy region 14 according to a formula K. The formula K is di=Di+AC×acGain, where acGain is a gain variable of the pixel which is predetermined by users according to the binarized image.

In the embodiment, the pixel gray value of the pixel with logic 1 is the black-gray, the pixel gray value of the pixel with logic 0 is white-gray.

Figure 8:
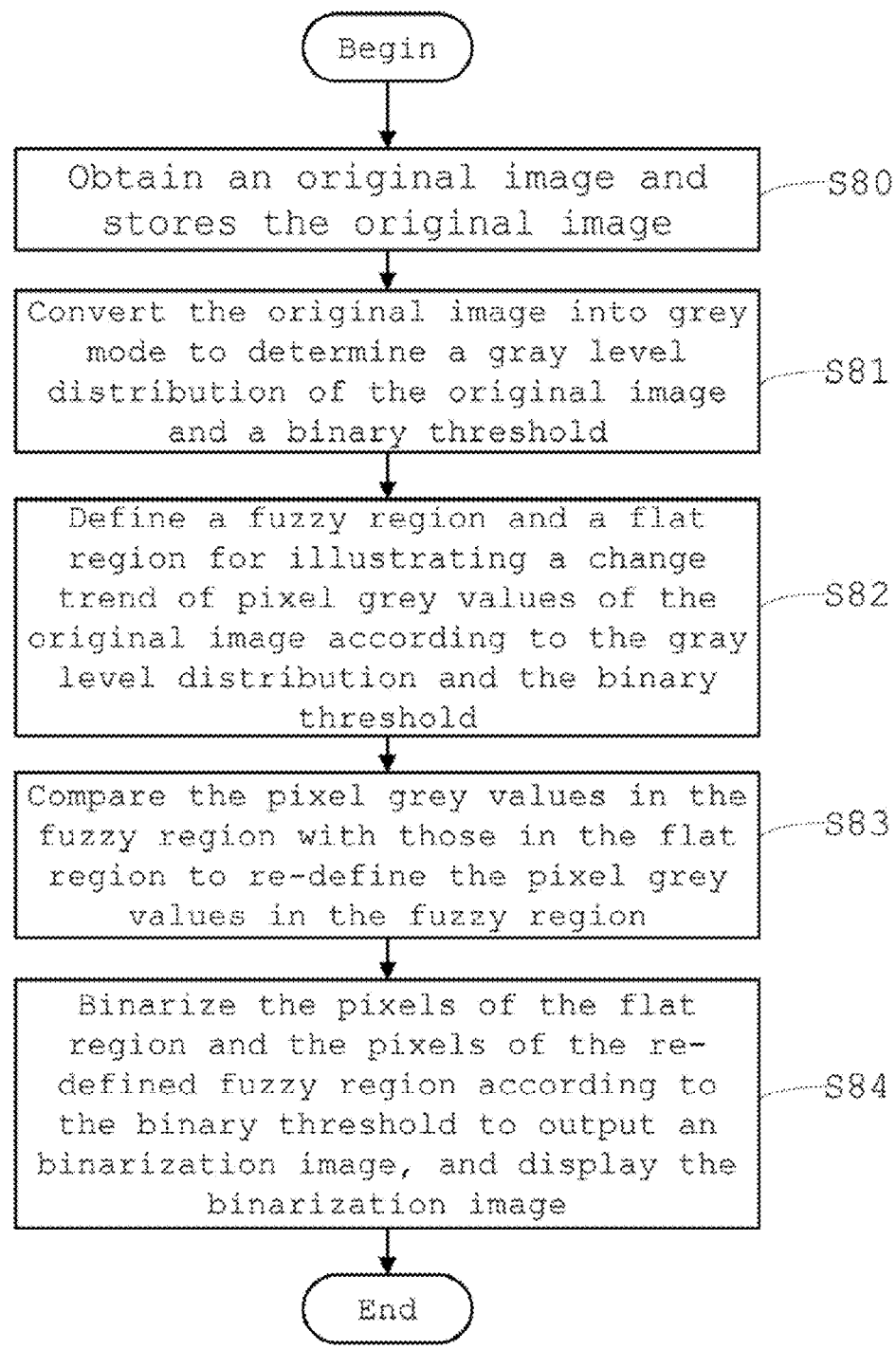
FIG. 8 is a flowchart illustrating a method applied by the electronic apparatus of FIG. 2 for binarizing the original image, in accordance with an exemplary embodiment.

FIG. 8 is a flowchart illustrating a method applied by the electronic apparatus 100 for binarizing the original image.

In step S80, the image obtaining unit 40 obtains the original image, and the storage unit 20 stores the obtained original image.

In step S81, the processing unit 30 converts the original image into a gray level image to determine the gray level distribution 16 of the original image and further determines the binary threshold M of the original image.

In step S82, the processing unit 30 defines the fuzzy region 14 and the flat region 15 of the original image to illustrate according to the gray level distribution 16 and the binary threshold M.

The fuzzy region 14 is a border area between a target object(s) and a background of the original image. Pixel gray values of neighbor pixels in the fuzzy region 14 are gradually changed from the target object to the background. The flat region 15 is a remaining part of the image excepting the fuzzy region 14. Pixel gray values of neighbor pixels in the flat region 15 are approximately the same.

In step S83, the processing unit 30 compares the gray values of the pixels in the fuzzy region 14 with the gray values of the pixels in the flat region 15 to obtain a comparison, and re-define the pixel gray values of the pixels in the fuzzy region 14 according to the comparison and the formula.

The processing unit 30 compares the pixel gray values of the pixels in the fuzzy region 14 with the pixel gray values of the pixels in the flat region 15 to determine the largest difference AC, and re-defines the pixel gray values of the pixels of the fuzzy region 14 according to the formula K. The formula K is di=Di+AC×acGain, where acGain is a gain variable of the pixel which is predetermined by users according to the binarized image, and Di is the original pixel gray value of the pixel in the fuzzy region 14.

In step S84, the processing unit 30 binarizes the pixels of the flat region 15 and the pixels of the re-defined fuzzy region 14 according to the binary threshold M to output an binarized image, and displays the binarized image on the display unit 10.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:
1. An electronic apparatus, comprising:
an image obtaining unit configured for obtaining an original image;
a processing unit configured for:
converting the original image into a gray level image to determine a gray level distribution of the original image and determining a binary threshold of the original image;
defining a fuzzy region and a flat region of the original image according to the gray level distribution and the binary threshold, wherein the fuzzy region is a border area between a target object or target objects and a background of the original image, and wherein gray values of pixels in the fuzzy region are gradually changed from the target object to the background, the flat region is a remaining part of the image excluding the fuzzy region, and gray values of pixels in the flat region are approximately the same;
comparing the gray values of the pixels in the fuzzy region with the gray values of the pixels in the flat region, and re-defining the pixel gray values of the pixels in the fuzzy region according to the comparison and a formula; and
binarizing the pixels of the flat region and the pixels of the re-defined fuzzy region according to the binary threshold to output an binarized image;

a display unit configured for displaying the original image and the binarized image.

2. The electronic apparatus as claimed in claim 1, wherein the gray level distribution is a gray histogram, and x-axis of the gray histogram are gray values from 0 to 255, and y-axis of the gray histogram are number of pixels of the gray level image corresponding to the gray values.

3. The electronic apparatus as claimed in claim 2, wherein the processing unit searches a region between a first pixel gray value and an edge pixel gray value of the gray level distribution to cumulate number of each pixel gray value in the region, and determines a pixel gray value having a smallest number to be the binary threshold.

4. The electronic apparatus as claimed in claim 3, wherein the processing unit determines a median of the edge pixel gray value of the gray level distribution and another edge pixel gray value of the gray level distribution to be an intermediate point of a binary threshold searching region and half of the width of the gray level distribution to be the width of the binary threshold searching region, calculates a first number of the pixels with an edge pixel gray value of the binary threshold searching region and a second number of the pixels with another edge pixel gray value of the binary threshold searching region, and determines a pixel gray value having a smaller number between the first number and the second number to be the first pixel gray value.

5. The electronic apparatus as claimed in claim 1, wherein the processing unit divides the pixels of the original image into N pixel groups, each pixel group includes A M*M matrixes, calculates a mean value of the pixel gray values of each matrix of each pixel group, and further determines the pixel groups including a largest pixel gray value and a smallest pixel gray value which are determined both to be larger than or smaller than the binary threshold at the same time to be the flat region, and the other pixel groups to be the fuzzy region.

6. The electronic apparatus as claimed in claim 5, wherein each of the pixel groups comprises a pixel in the fuzzy region and at least one pixel in the flat region.

7. The electronic apparatus as claimed in claim 5, wherein the processing unit compares the pixel gray values in the fuzzy region with the pixel gray values in the flat region of each pixel group to generate the comparison, determines a largest difference according to the comparisons of the pixel groups, and re-defines the pixel gray values of the pixel of the fuzzy region according to the largest difference and the formula.

8. The electronic apparatus as claimed in claim 7, wherein the formula is di=Di+AC×acGain, di is the pixel gray value of the re-defining fuzzy region, Di is the pixel gray value of the fuzzy region of the original image, AC is the largest difference, and acGain is a gain variable of the pixel.

9. The electronic apparatus as claimed in claim 1, wherein the processing unit calculates a mean value of a red component, a green component, and a blue component of each pixel to convert the original image into gray level, the gray value of each pixel of the gray level image falls in the region of 0 to 255.

10. A computerized method implemented by a processor of a computing device, comprising:
obtaining an original image and storing the obtained original image;
converting the original image into a gray level image to determine the gray level distribution of the original image and further determining a binary threshold of the original image;
defining a fuzzy region and a flat region of the original image according to the gray level distribution and the binary threshold, wherein the fuzzy region is a border area between a target object or target objects and a background of the original image, and wherein gray values of pixels in the fuzzy region are gradually changed from the target object to the background, the flat region is a remaining part of the image excluding the fuzzy region, and gray values of pixels in the flat region are approximately the same;
comparing the gray values of the pixels in the fuzzy region with the gray values of the pixels in the flat region to obtain a comparison, and re-defining the pixel gray values of the pixels in the fuzzy region according to the comparison and a formula; and
binarizing the pixels of the flat region and the pixels of the re-defined fuzzy region according to the binary threshold to output an binarized image, and displaying the binarized image.

11. The method as claimed in claim 10, wherein the gray level distribution is a gray histogram, and x-axis of the gray histogram are gray values from 0 to 255, and y-axis of the gray histogram are numbers of pixels of the gray level image corresponding to the gray values.

12. The method as claimed in claim 10, wherein determining the binary threshold comprising:
determining a median of an edge pixel gray value of the gray level distribution and another edge pixel gray value of the gray level distribution to be an intermediate point of a binary threshold searching region and half of the width of the gray level distribution to be the width of the binary threshold searching region;
calculating a first number of the pixels with an edge pixel gray value of the binary threshold searching region and a second number of the pixels with another edge pixel gray value of the binary threshold searching region;
determining a pixel gray value having a smaller number between the first number and the second number to be a first pixel gray value;
searching a region between the first pixel gray value and the edge pixel gray value of the gray level distribution to cumulate number of each pixel gray value in the region, and determining a pixel gray value having a smallest number to be the binary threshold.

13. The method as claimed in claim 10, further comprising:
dividing the pixels of the original image into N pixel groups, each pixel group includes A M*M matrixes;
calculating a mean value of the pixel gray values of each matrix of each pixel group; and
determining the pixel groups including a largest pixel gray value and a smallest pixel gray value which are determined both to be larger than or smaller than the binary threshold at the same time to be the flat region, and the other pixel groups to be the fuzzy region.

14. The method as claimed in claim 13, wherein each of the pixel groups comprises a pixel in the fuzzy region and at least one pixel in the flat region.

15. The method as claimed in claim 13, further comprising:
comparing the pixel gray values in the fuzzy region with the pixel gray values in the flat region of each pixel group to generate the comparison;
determining a largest difference according to the comparisons of the pixel groups; and
re-defining the pixel gray values of the pixel of the fuzzy region according to the largest difference and the formula.

16. The method as claimed in claim 15, wherein the formula is $di=Di+AC\times acGain$, di is the pixel gray value of the re-defining fuzzy region, Di is the pixel gray values of the fuzzy region of the original image, AC is the largest difference, and acGain is a gain variable of the pixel.

* * * * *